(12) United States Patent
McManus

(10) Patent No.: US 6,668,510 B2
(45) Date of Patent: Dec. 30, 2003

(54) DEFLECTION CLIP FOR STUD WALL CONSTRUCTION

(76) Inventor: Ira J. McManus, 39 Lincoln Ave., Florham Park, NJ (US) 07932

( * ) Notice: Subject to any disclaimer, the term of this patent is extended or adjusted under 35 U.S.C. 154(b) by 0 days.

(21) Appl. No.: 10/039,662

(22) Filed: Jan. 4, 2002

(65) Prior Publication Data

US 2003/0126823 A1 Jul. 10, 2003

(51) Int. Cl.[7] .............................. E04C 5/00; E04H 12/00
(52) U.S. Cl. .............................. 52/712; 52/714; 52/715; 52/655.1; 403/403
(58) Field of Search .................... 52/712, 714, 715, 52/655.1, 127, 234–235, 236.3, 236.6, 236.9, 208, 238.1, 243.1, 281, 357, 380, 359, 360, 463, 573.1, 781.3, 481.1, 489.1, 502, 508, 509, 665, 512, 584, 506.1, 668–667, 241, 721; 403/403, 397, 387

(56) References Cited

U.S. PATENT DOCUMENTS

| 3,438,168 | A | * | 4/1969 | Tischuk | ........................ | 52/478 |
| 4,102,105 | A | * | 7/1978 | Taylor et al. | ................. | 52/520 |
| 4,121,391 | A |   | 10/1978 | Schroeder | | |
| 4,433,524 | A |   | 2/1984 | Matson | | |
| 4,518,279 | A | * | 5/1985 | Suttles | ........................ | 403/231 |
| 4,570,400 | A |   | 2/1986 | Slager et al. | | |
| 5,640,823 | A |   | 6/1997 | Bergeron et al. | | |
| 6,408,589 | B1 | * | 6/2002 | Bousquet | ...................... | 52/714 |
| 6,415,575 | B1 | * | 7/2002 | Thompson | ................... | 52/712 |
| 6,427,416 | B1 | * | 8/2002 | Rassel | .......................... | 52/714 |
| 6,446,409 | B1 | * | 9/2002 | Emerson | ...................... | 52/712 |
| 6,488,257 | B2 | * | 12/2002 | McSwain | ................. | 249/219.2 |

* cited by examiner

Primary Examiner—Jeanette Chapman
(74) Attorney, Agent, or Firm—W. Patrick Quast, Esq.

(57) ABSTRACT

An improved deflection clip for connecting a stud to a structural building member while permitting relative compensating vertical movement of the clip, is disclosed. A planar sheet portion having a front end and a left and right side, has at least two perpendicular panels. A first panel extends downward at the front end of the planar sheet portion to form a bearing surface portion. The left side panel extends forward of the bearing surface portion and has an acute angle bend along its front width. This front segment is secured over the edge of a stud return, and the clip is then rotated so that the bearing surface portion contacts the outer surface of the stud flange. The laterally extending top surface of the planar sheet portion is then secured in any convenient manner to a bottom surface of a structural building member.

12 Claims, 6 Drawing Sheets

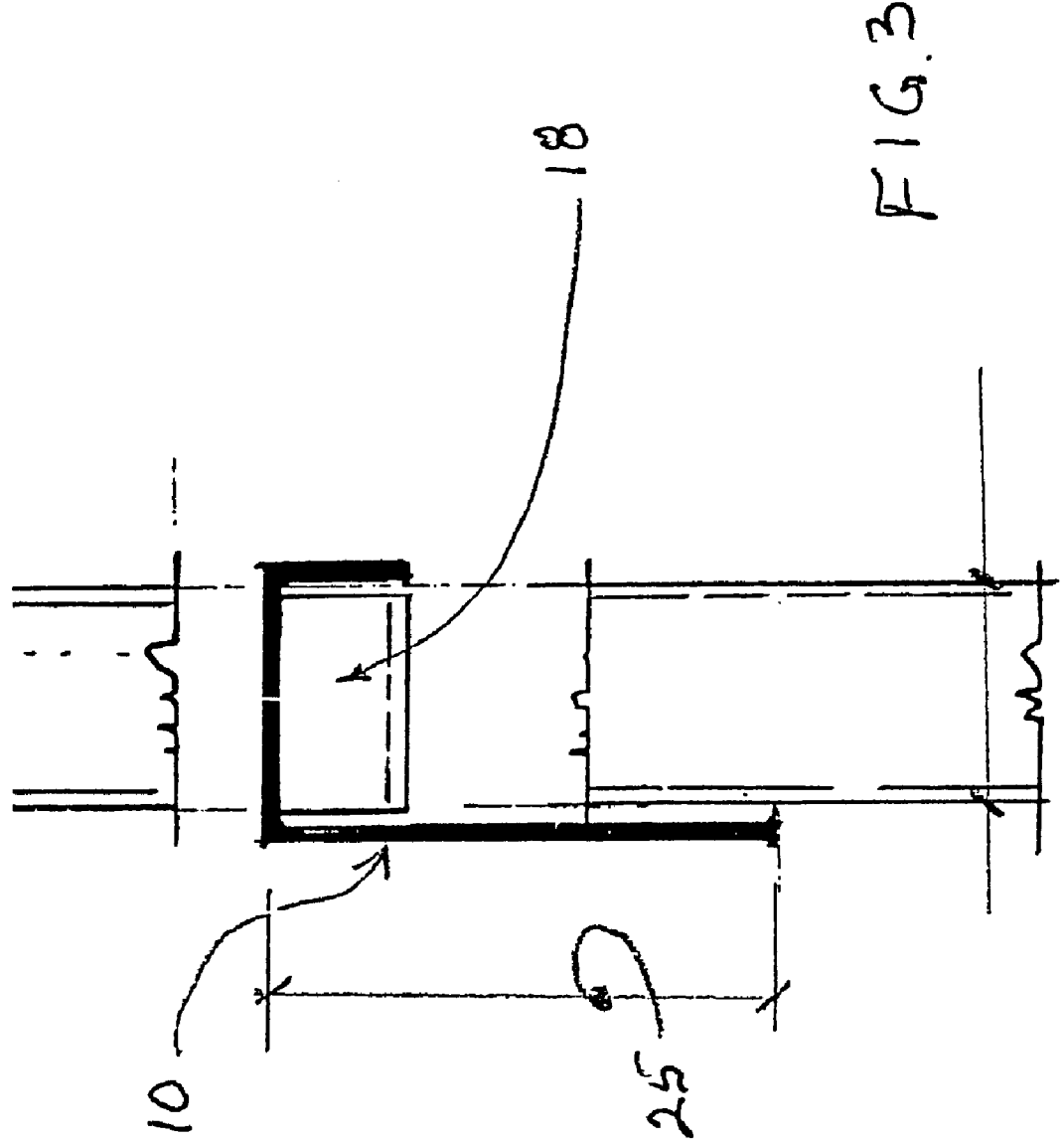

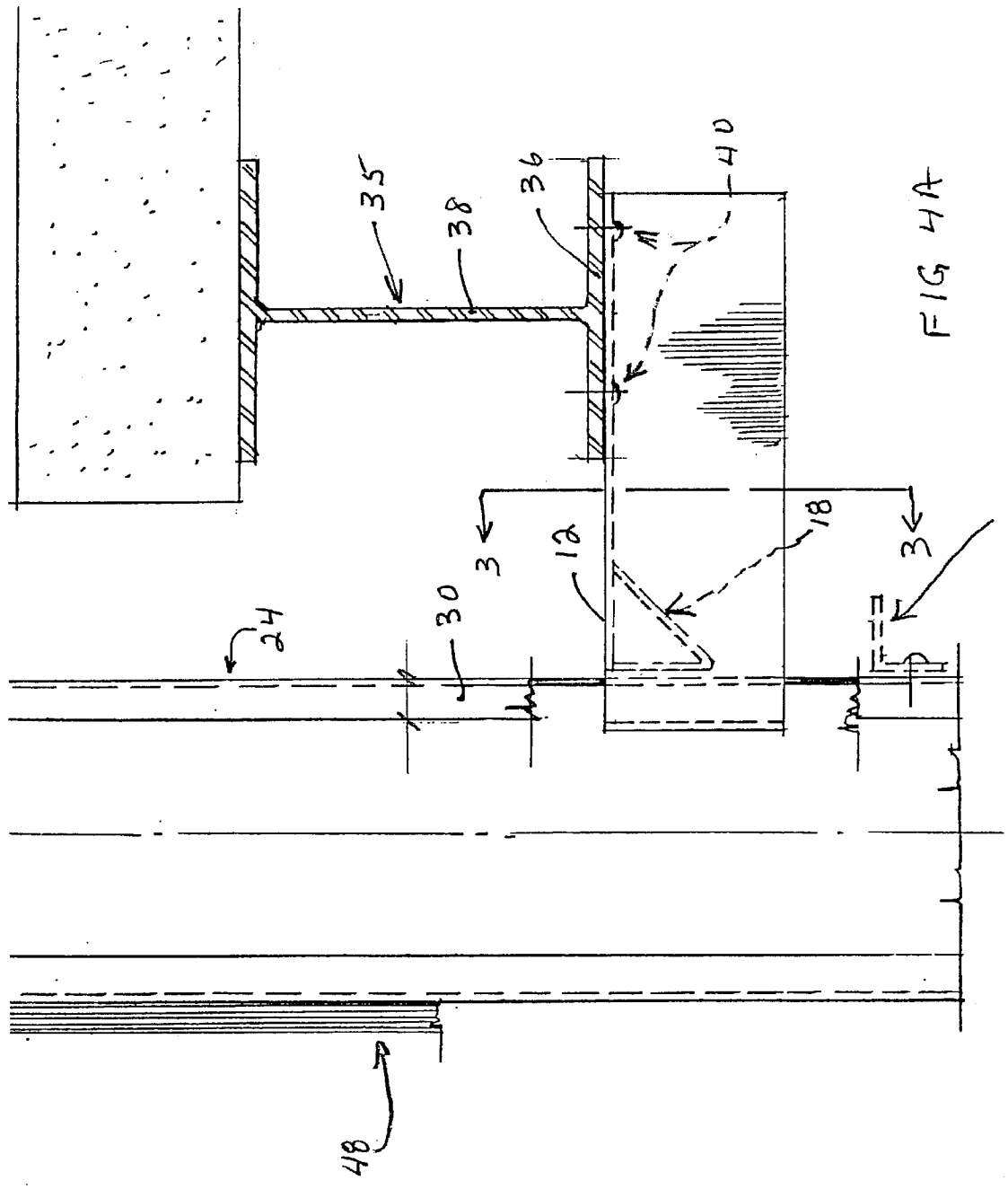

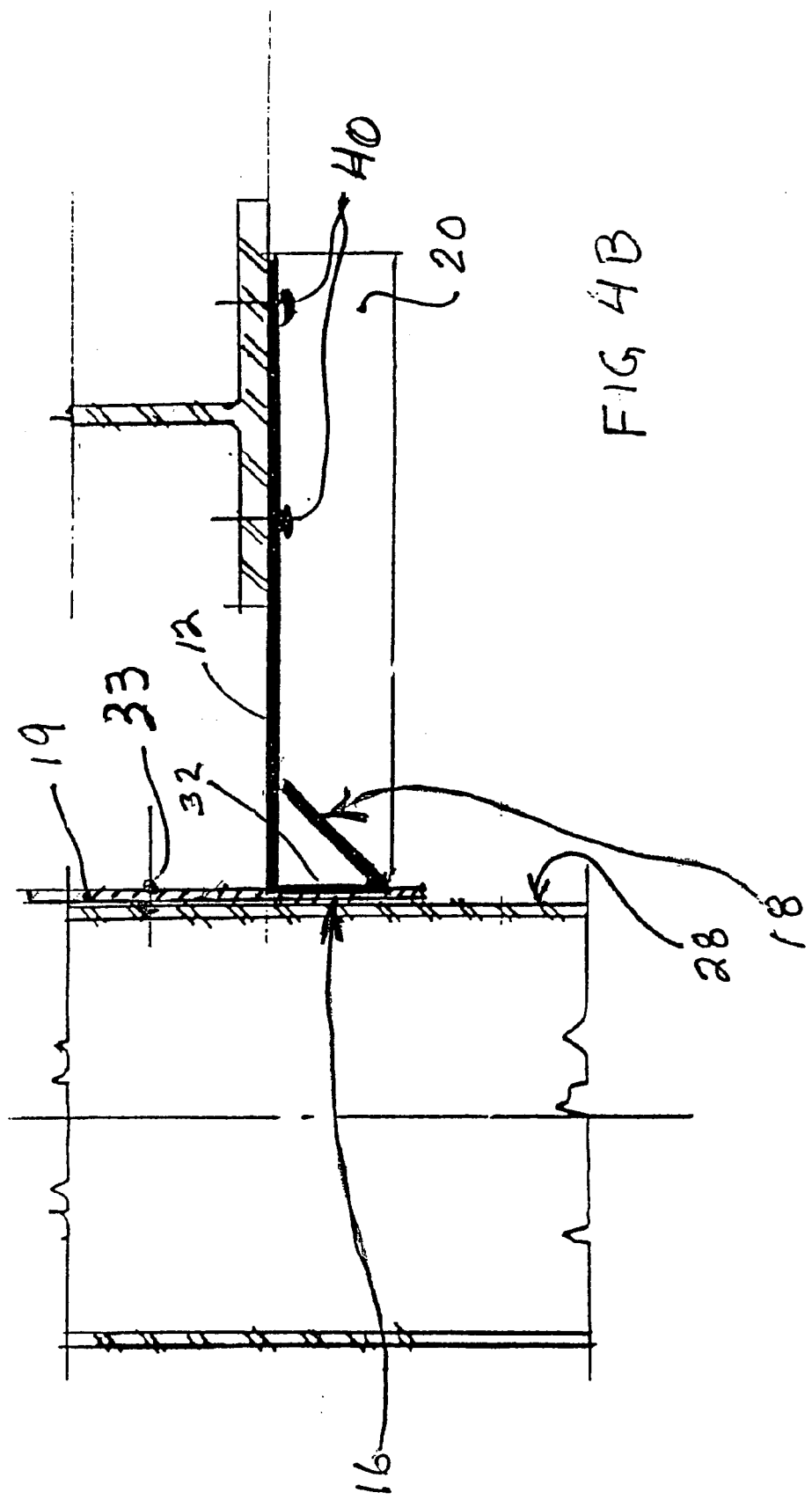

DEFLECTION CLIP FOR STUD WALL CONSTRUCTION

BACKGROUND

This invention relates to stud wall construction for buildings, and in particular to a deflection clip for connecting a building stud to a structural member of the building.

Contemporary design of buildings often make use of cold formed steel studs to frame the building exterior. These studs are manufactured to industry standards, being rectangular-shaped, elongated steel beams. Typical steel gauge thickness is 12 to 20 gauge, having a flat rear wall measuring 4", 6", or 8" in width, left and right side flanges connected at right angles to the rear wall measuring 1⅝", 2", or 2½" in width, and left and right flange returns at the front portion of the stud, each flange return measuring approximately 9/16" or 11/16" in width at right angles to each side panel, the flange returns defining an opening to the internal central area of the stud. The width of this opening to the central area of the stud is determined by the width of the rear wall selected. Studs are usually faced with plywood, gypsum board, or other finishes on both sides. Brick or stone is often connected to the outside face of the studs. The term "stud" as used above will refer to this same structure throughout this application.

Generally studs are supported separately from the floors and roof. The studs are subject to direct horizontal wind and suction forces. The building floors and roof are subject to vertical loads. Studs, of course, must be connected to these structural building members. Often these connections are made in a manner permitting damage to occur to either the stud wall or building structure or both due to the competing nature of forces acting on these connections. Obviously it would be desirable to connect studs to the internal building structure in a manner permitting relative compensating movement while maintaining the structural integrity of the building.

Numerous devices and methods have been suggested in the past to address this construction requirement as is evident, for example, with U.S. Pat. No. 4,121,391. This patent discloses a building clip 30 (FIG. 1) utilized for connecting a vertical member (stud) 16 (FIG. 1), to a horizontal chamber 11 (FIG. 1) building member. Joined "securely to the roof, beams and/or columns of the building", col. 2. lines 15–16, a horizontal portion 31 of the building clip 30 is positioned within the central area of the stud 16, with one perpendicular front panel 32 being positioned against the internal surface of the stud flange return 19, and a second perpendicular front panel 33 being attached to the vertical member 16. In this manner the building clip 30 connects the stud 16 to the horizontal channel 11, thereby preventing horizontal movement of the stud and horizontal channel, while permitting vertical movement therebetween.

In U.S. Pat. No. 4,433,524, there is described a slip-connector structural joint. The preferred embodiment utilizes two plates, 18 and 19 (FIG. 1). Each engages the channel-shaped side portion 12 (FIG. 1) including two angled sides 13 and 14. The other end off the first plate 18 is welded to the top surface of the structural member 10. The second plate after engaging the channel-shaped side portion is then disposed horizontally in contact with the top of plate 18 and then welded thereto. A single plate configuration is described in text accompanying FIGS. 7 and 8.

Again, in U.S. Pat. No. 4,570,400, a curtain wall stud slide clip is disclosed. This clip 10 (FIG. 1) is described as being comprised of a strut 12 and pair of fins 14 (FIG. 1), said strut having a notch 18 extending into each of the fins. A detent mechanism 16 is formed by a pair of stays 20 surrounding the notch 18. In use the notch in the stud slide clip 10 fits over the stud flange return 42 (FIG. 5), with one fin contacting the internal wall of the stud flange 52 (FIG. 5) and the second fin being welded to a horizontal structural building member 41. In use, the clip 10 will stay in place without hand support due to the detents, while still permitting vertical stud/building structure movement and preventing horizontal movement therebetween.

Additionally, U.S. Pat. No. 5,640,823 teaches the use of a vertical movement clip 10 (FIG. 1) for connecting a building member to a stud. This clip 10 is comprised of a base plate 18 (FIG. 1), a downwardly extending arm 14 from one end of the base plate, an upwardly extending arm 12 from a second end of the base plate, and a flange 16 attached to a side portion of the base plate. In use the base plate 18 with its extending arms 12, 14 fit within and conform to the central area of a stud 20 (FIG. 3) while the extending flange 16 is secured to a floor 22 or other structural building member, thereby preventing horizontal movement, but permitting vertical movement therebetween.

While the above noted devices and methods provide useful means for addressing this aspect of building construction, they do not envisage the simplicity in use, and significant economies in fabrication of the present invention.

It is therefore a primary object of the present invention to provide a deflection clip for connecting studs to a structural building member so as to permit relative movement therebetween.

A further object of the present invention is to provide a deflection clip for connecting studs to a structural building member with the clip having no positive connection to the stud.

Yet another object is to provide a deflection clip "stud to structural member" connector that is relatively inexpensive to fabricate.

Still another object is to provide a deflection clip "stud to structural member" connector that is quickly and easily installed by an operator.

SUMMARY

These and other objectives are obtained with the improved deflection clip of the present invention.

As mentioned above, steel studs are frequently employed to form a curtain wall on a building. The studs are generally placed in a vertical position just beyond the outside of the structural frame. After the studs are positioned in place and connected to the building structure, they are faced on both sides with pre-selected panels of plywood, gypsum board, and so on. Often brick or stone is connected to the outside face of the studs. Obviously during the life of a building the studs must withstand the outside horizontal wind and suction forces, and the oppositely acting vertically downward and upward rebounding forces exerted on the floors and roof of the building.

It occurred that since virtually all cold formed steel studs are manufactured to an industry standard, a simplified deflection clip structure could be fabricated for connection to these studs. Industry standard cold form steel studs are rectangular-shaped steel beams with a hollow central area accessible from the top, bottom, and front of the stud. Typical gauge thickness is 16, 18, or 20 gauge, with web rear wall dimensions generally measuring 4", 6", or 8" in width; left and right flanges (sides) connected at right angles to the web generally measuring 1⅝", 2", or 2½" in width; and typical flange returns connected at right angles to the flanges measuring 9/16" or 11/16" in width.

With the relatively small possible differences in flange return widths and stud gauge known in advance, it becomes possible to construct an economical and simple to attach deflection clip. All that is actually required is a secure connection to the flange return of the stud to resist horizontal movement away from the structural building member, and a flush connection with the stud flange to resist horizontal movement towards the member, with the deflection clip/stud connection free to move up or down for required vertical movement of the structural members.

To accomplish this, a generally rectangular-shaped deflection clip is constructed. A sturdy clip can be made from, for example, 12 gauge sheet steel. A planar top sheet portion of the clip serves as the platform for securing the clip to the bottom surface of a roof or steel or concrete building structure. The planar top sheet portion can be considered to have a left side, a right side, and a front and rear section contiguous with the planar top sheet portion. The left side, hereinafter to be referred to as the tension flange, is positioned along the length of the top sheet portion, being perpendicular to the planar surface of the top sheet portion, and extending beyond the front section of the top sheet portion. The right side of the top sheet portion is comprised of a panel along the complete length of the top sheet portion, contiguous with and perpendicular to the top sheet portion, this right side hereinafter to be referred to as the stiffener wing. A panel contiguous with and perpendicular to the width of the front section (adjacent the extended length of the tension flange) forms the bearing surface portion of the clip. The lower segment of the bearing surface portion is bent inwards and upwards, forming an acute angle with the inner surface of the perpendicularly extending bearing surface portion and the planar top sheet portion of the clip so as to reinforce the bearing surface portion as it bears against the stud flange. Finally, a forward segment of the tension flange, which extends beyond the bearing surface portion, is bent at an approximate 45° angle in relation to the inner surface of the tension flange to form a further flange member.

In use the deflection clip of the invention is connected to the stud by being simply connected to the stud flange return by means of the further flange member at the end of the tension flange. The clip is then rotated so that its bearing surface portion bears against the outer surface of the stud flange. The extended planar top sheet portion of the clip is then welded, screwed, or bolted to the under surface of a steel or concrete beam, or roof of the building structure.

Thus a unique, new convenience is added by the deflection clip of the present invention. Studs are secured to structural building members in a simple and economical manner so as to resist horizontal and suction forces, while at the same time permitting differential vertical movements. The length of the deflection clip can be made long enough to accommodate most situations where the distance from the stud to the beam can vary from a few inches to over a foot. Connection to the bottom of the beam avoids hard to make connections to the beam web as with other devices. In addition the connection is not dependent on the location of the end of the floor slab or roof structure to which other devices are usually connected.

While the deflection clip of the present invention has been described as being fabricated out of sheet steel, it is to be noted that other suitable materials, including aluminum, wood, or rigid plastic, may also be employed depending on designer preference.

BRIEF DESCRIPTION OF THE DRAWINGS

FIG. 3 is a schematic end view of one version of the deflection clip of the invention taken along lines 3—3 of FIG. 4A.

FIG. 4A is a partially cut-away, schematic side elevation view of one version of the deflection clip of the invention in place taken along lines 4A—4A of FIG. 1.

FIG. 4B is a view similar to FIG. 4A, illustrating a shim in place taken along lines 4B—4B of FIG. 1.

DESCRIPTION OF THE PREFERRED EMBODIMENT

Figure 1:
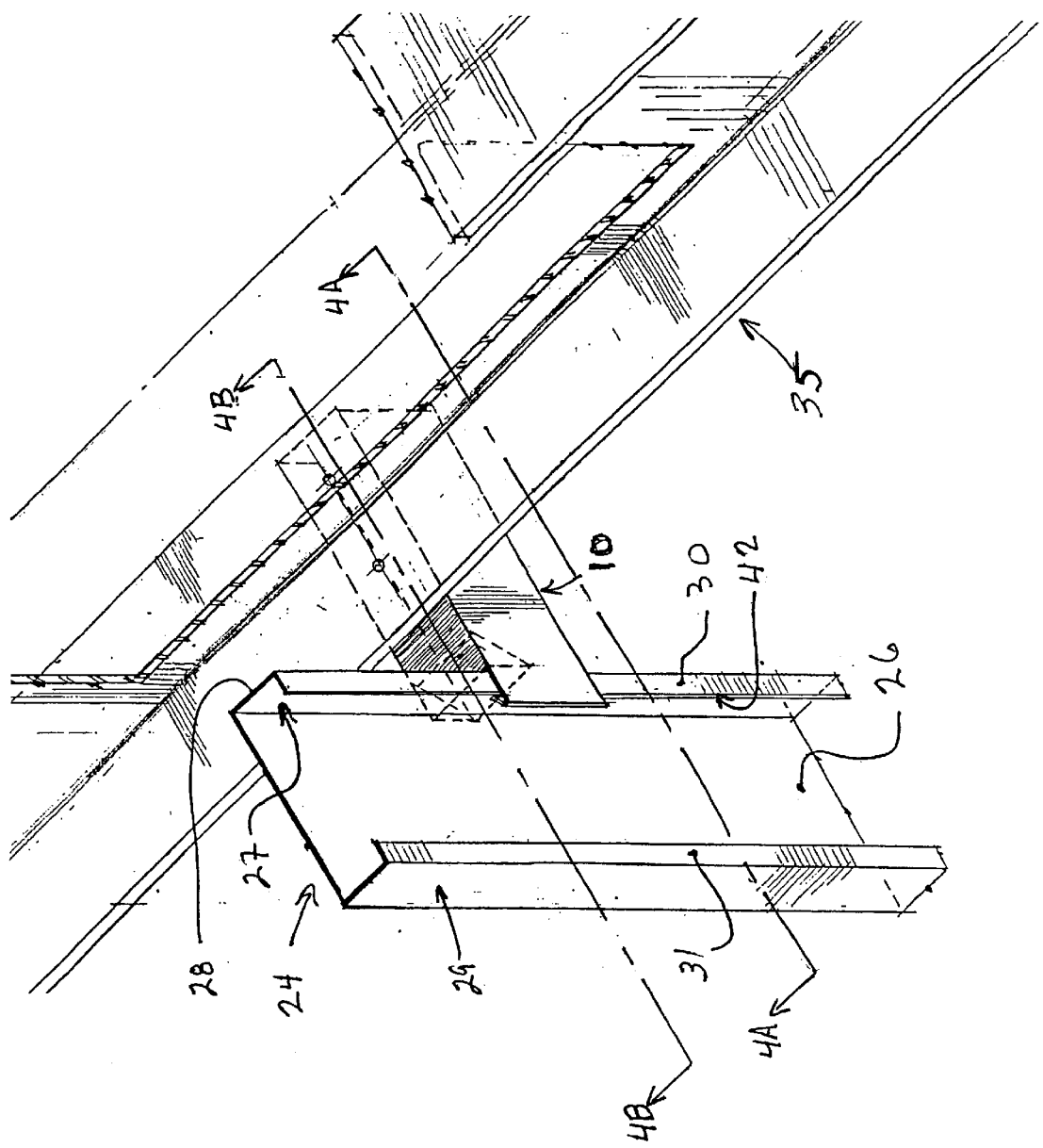
FIG. 1 is a perspective view of one version of the deflection clip of the invention shown in position, connecting a steel stud to the bottom surface of a steel beam.
Figure 2:
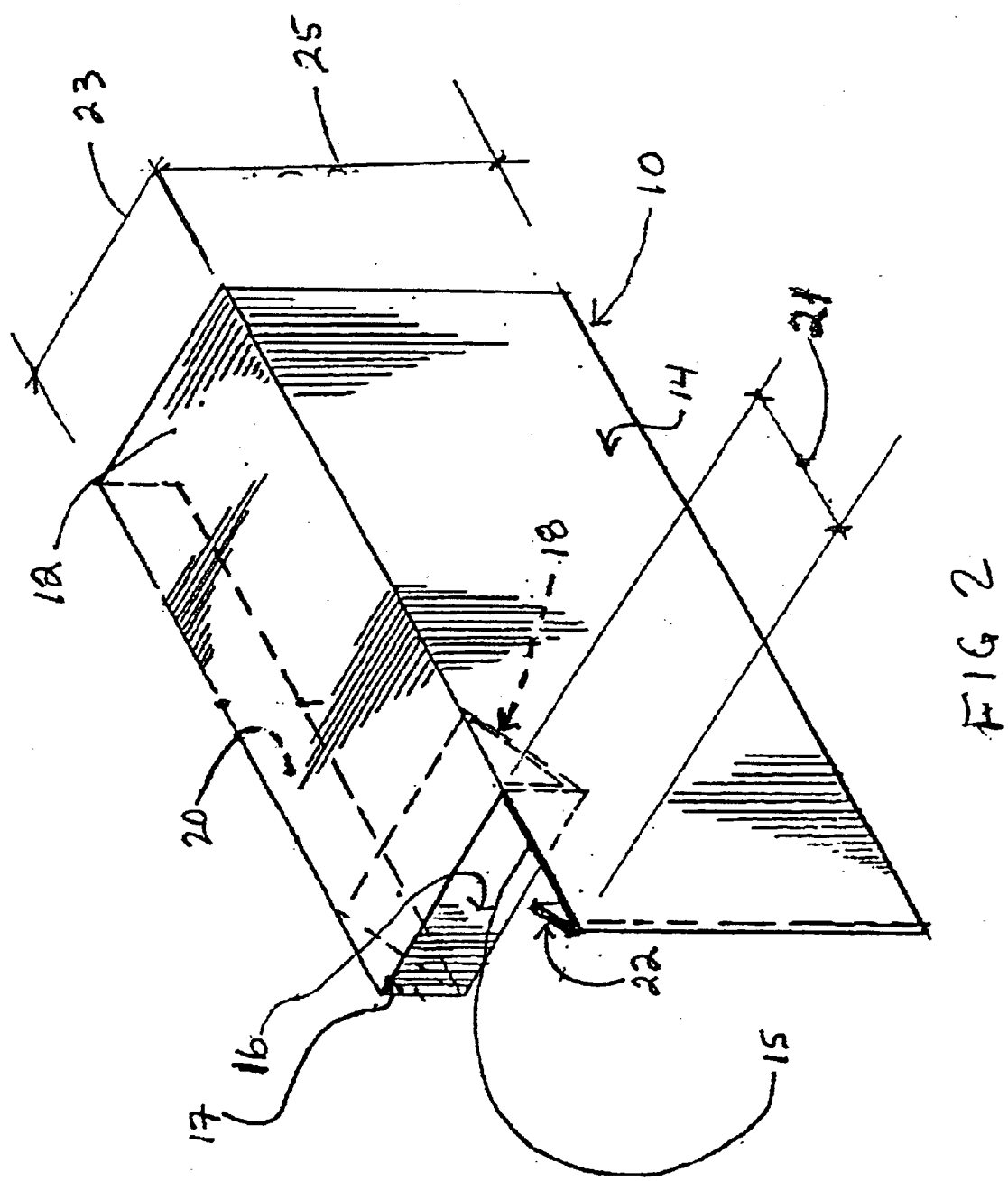
FIG. 2 is a perspective view of one version of the deflection clip of the invention.

Referring now to the drawings wherein similar structures having the same function are denoted with the same numerals throughout the several views, a version of the deflection clip 10 of the present invention is shown connected to a steel stud 24, and about to be secured to the bottom surface of a steel beam 35. As best seen in FIGS. 2–4, the deflection clip 10, which can be fabricated from, for example, 12 gauge sheet steel, can have a generally rectangular shape as seen in FIG. 2. A rectangular-shaped planar top sheet portion 12 serves as the platform for the connection to the structural building member. Three panels, (14, 16, 20), perpendicular to and contiguous with the planar top sheet portion 12, complete the structural members of the deflections clip 10. A first panel, comprising the bearing surface portion 16, runs the front width 23 of the top sheet portion 12. A second panel, comprising the tension flange 14, runs the length of the clip and extends a spaced distance 21 forward of the front end 17 of the top sheet portion 12. A third panel, comprising the stiffener wing 20, runs the full length of the right side of the top sheet portion. It extends downward a distance sufficient to assist in inhibiting the buckling of the top sheet portion under load.

The width dimension 25 of the tension flange can vary depending on the gauge of the sheet steel and the anticipated horizontal load. A value in the range of two to six inches is anticipated. The front segment 22 of the tension flange is bent to form a further flange member at an approximate 45° angle with respect to the inner surface 15 of the tension flange. This front segment formed in the tension flange will serve as a sturdy and stable connection to the edge 42 of a stud return flange 30 and guide for securing the bearing surface portion 16 flush against the stud flange surface 28.

As seen in FIGS. 4A and 4B, a lower segment 18 of the bearing surface portion 16 is bent inwards and upwards at an acute angle relative to the inner surface 32 of the bearing surface portion. This bent lower segment 18 serves as a reinforcement to the bearing surface portion 16. The stiffener wing 20 available to reinforce the top sheet portion extends along the length of the right side of the planar top surface.

Figure 5:
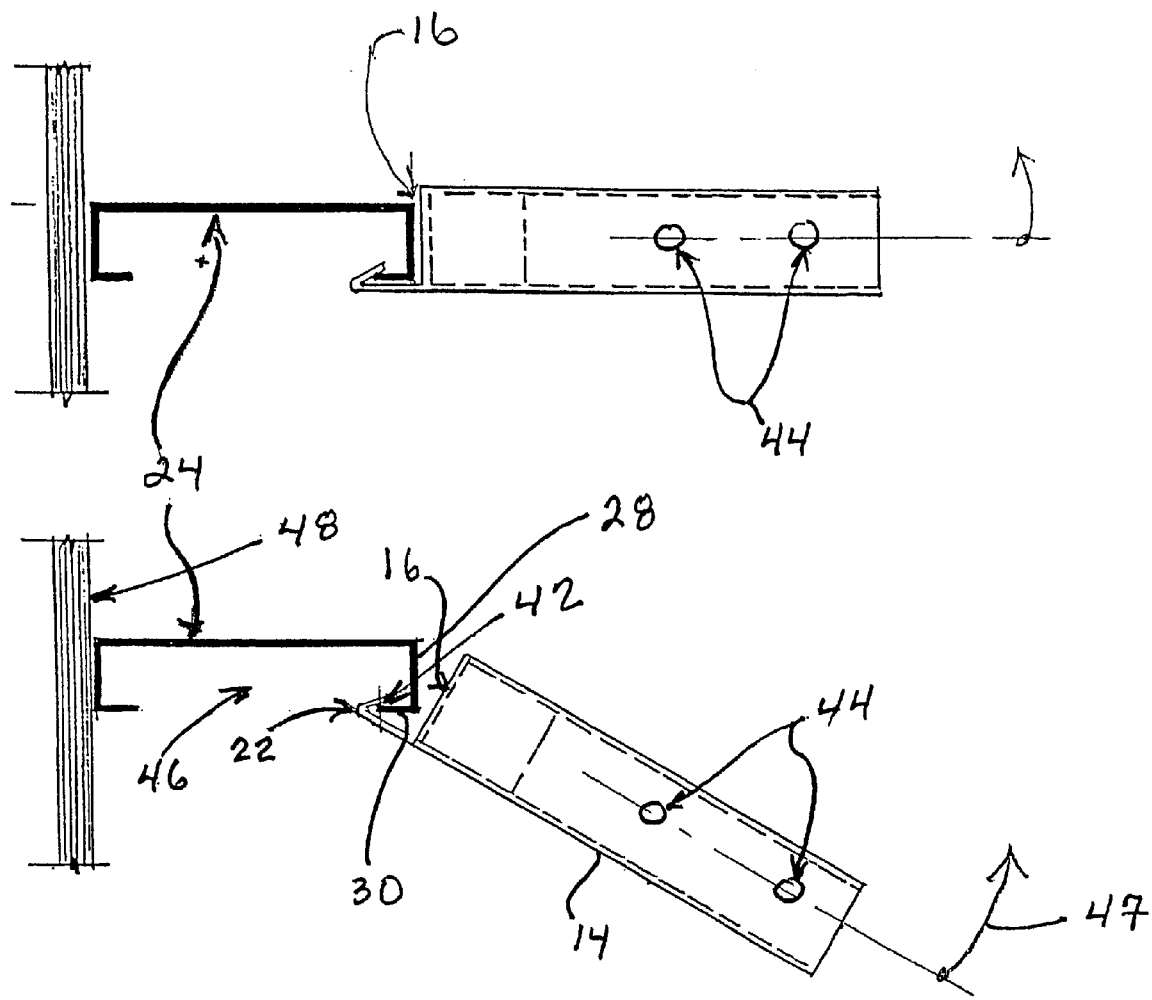
FIG. 5 is a schematic plan view of part of the installation procedure utilizing one version of the deflection clip of the invention.

FIGS. 2 and 5 illustrate the process of affixing the deflection clip between the steel stud 24 and the steel beam

35. A typical steel stud as noted above has a rear wall 26, left and right flanges 27 and 29, and left and right flange returns 30 and 31. FIG. 5 illustrates steel studs connected to a curtain wall 48 in the process of being connected via the deflection clip to a steel beam 35. The front segment 22 at the front of the tension flange 14 is secured over the edge 42 of a flange return 30 and within the stud central area 46. The clip is then rotated in the direction of the arrow 47 so that the bearing surface portion 16 bears against the outer surface 28 of the stud flange 27. At this point an operator may make further adjustments to the front segment 22 at the end of the tension flange and the upwardly bent lower segment 18 of the bearing surface portion to further secure contact between the clip and the stud. Alternatively as seen in FIG. 4B, if a space needs to be filled between the outer surface 28 of the stud flange and the bearing surface portion 16 of the deflection clip, a shim 19, fabricated in sheet metal, plastic or other suitable material, can be affixed to the outer surface of the stud flange in any convenient manner, such as utilizing a bolt fastener 33, or adhesive (not shown), or otherwise. The shim can include a segment which overhangs and engages the tension flange to prevent its slippage while being installed. The planar top sheet portion 12 of the clip is now connected to the steel beam 35, shown with a web 38 and flange 36 portion. The top sheet portion 12 is placed beneath the flange of the beam and may be screwed (not shown), or bolted 40 to the underside of the beam, making use of apertures 44 in the top surface. Alternatively, the clip top sheet portion can be connected to a building structure in any convenient manner, as, for example, welding. With the deflection clip now firmly secured to a building structure, and to a stud in the manner described, horizontal movement is resisted, yet vertical movement relative to the stud and building structure is permitted.

While the present invention has been disclosed in connection with versions shown in detail, various modifications and improvements will become readily apparent to those skilled in the art. Accordingly, the spirit and scope of the present invention is to be limited only by the following claims.

What is claimed is:

1. A deflection clip for connecting a stud to a structural building member, so as to permit relative movement therebetween, the stud having a flange, the flange including an outer surface and a stud flange return, comprising:
   (a) a planar sheet portion having a left side, a right side oppositely disposed from said left side, a front end, and a rear end oppositely disposed from said front end;
   (b) a first panel, said first panel being contiguous with said front end, said first panel extending perpendicularly downward from said planar sheet portion; and,
   (c) a second panel, said second panel having an inner surface and an outer surface, said second panel being contiguous with said left side of said sheet, said second panel extending perpendicularly downward from said planar sheet portion said second panel extending laterally a spaced distance forward of said first panel to form a front segment of said second panel, said front segment including a further flange member formed at an angle with said inner surface of said second panel, said further flange member formed in said second panel cooperating with said first panel, said spaced distance of a predetermined value such that when said further flange member is placed over an edge of the stud flange return and said deflection clip is rotated into a predetermined position by an operator, said first panel contacts the outer surface of the flange on the stud such that when said deflection clip is secured to said structural building member, horizontal movement therebetween is resisted, while relative vertical movement between the stud flange return and said further flange member is permitted.

2. The deflection clip according to claim 1, further comprising a third panel, said third panel being contiguous with said right side of said planar sheet portion, said third panel extending perpendicularly downward front said planar sheet portion.

3. The connection clip according to claim 1, wherein said first panel includes a lower segment and an inner surface, said first panel further comprising a reinforcing member, said reinforcing member formed by bending said lower segment first inwardly and then upwardly at an acute angle to the inner surface of said first panel.

4. The connection clip according to claim 2, wherein said first panel includes a lower segment and an inner surface, said first panel further comprising a reinforcing member, said reinforcing member formed by bending said lower segment first inwardly and then upwardly at an acute angle to the inner surface of said first panel.

5. The deflection clip according to claim 1 wherein the width of said second panel is determined and set after a consideration of the gauge of the material used to form said clip and the horizontal forces to be experienced by the clip.

6. The deflection clip according to claim 2 wherein the width of said second panel is determined and set after a consideration of the gauge of the material used to form said clip and the horizontal forces to be experienced by the clip.

7. The deflection clip according to claim 1, further comprising one or more apertures in said planar sheet portion for the passage therethrough of connecting fasteners to facilitate connection of said sheet portion to said structural building member.

8. The deflection clip according to claim 2, further comprising one or more apertures in said planar sheet portion for the passage therethrough of connecting fasteners to facilitate connection of said sheet portion to said structural building member.

9. The deflection clip according to claim 1, wherein said first panel includes an outer surface, said clip further comprising a shim, said shim being disposed between the outer surface of the flange on the stud and the outer surface of said first panel so as to take up any space therebetween as circumstances require.

10. The deflection clip according to claim 2, wherein said first panel includes an outer surface, said clip further comprising a shim, said shim being disposed between the outer surface of the flange on the stud and the outer surface of said first panel so as to take up any space therebetween as circumstances require.

11. The deflection clip according to claim 9, further comprising one or more apertures in said planar sheet portion for the passage therethrough of connecting fasteners to facilitate connection of said sheet portion to said structural building member.

12. The deflection clip according to claim 10, further comprising one or more apertures in said planar sheet portion for the passage therethrough of connecting fasteners to facilitate connection of said sheet portion to said structural building member.

* * * * *

UNITED STATES PATENT AND TRADEMARK OFFICE
CERTIFICATE OF CORRECTION

PATENT NO. : 6,668,510 B2 Page 1 of 1
DATED : December 30, 2003
INVENTOR(S) : Ira J. McManus It is certified that error appears in the above-identified patent and that said Letters Patent is hereby corrected as shown below:

Column 5,
Line 56, insert a comma after the word "portion" -- , --.

Column 6,
Line 11, change the word "front" to -- from --.

Signed and Sealed this

Twenty-fourth Day of February, 2004

JON W. DUDAS
*Acting Director of the United States Patent and Trademark Office*